Sept. 9, 1969 M. C. HENDRICKSON 3,466,385

CORRELATION TESTING ARRANGEMENT FOR A SUBSCRIPTION TELEVISION RECEIVER

Filed June 13, 1967 2 Sheets-Sheet 1

Inventor
Melvin C. Hendrickson

By James E. Tracy

Attorney

Sept. 9, 1969 M. C. HENDRICKSON 3,466,335

CORRELATION TESTING ARRANGEMENT FOR A SUBSCRIPTION TELEVISION RECEIVER

Filed June 13, 1967 2 Sheets-Sheet 2

Inventor
Melvin C. Hendrickson

By James E. Tracy
Attorney

United States Patent Office 3,466,385 Patented Sept. 9, 1969

3,466,385

CORRELATION TESTING ARRANGEMENT FOR A SUBSCRIPTION TELEVISION RECEIVER

Melvin C. Hendrickson, Elmhurst, Ill., assignor to Zenith Radio Corporation, Chicago, Ill., a corporation of Delaware Filed June 13, 1967, Ser. No. 645,693
Int. Cl. H04n *1/44*
U.S. Cl. 178—5.1 10 Claims

ABSTRACT OF THE DISCLOSURE

A series of separate time-spaced correlation tests, occurring during a testing period, are made to conclusively determine if a subscription television receiver is appropriately adjusted as required to achieve decoding. If all of the tests indicate correct correlation, a control effect is developed that remains at a constant amplitude throughout the testing period. When the receiver is properly positioned, each test effects the actuation of a multicondition mechanism to its set operating condition from its reset condition in which it is established at a reset time occurring just prior to each test. The output signal of the mechanism is rectangular shaped since its amplitude changes with each change in operating condition. The amplitude variations are eliminated, in order to provide the control effect, by inhibiting the output signal during the intervals from each reset time to the immediately succeeding correlation test.

Figure 1:
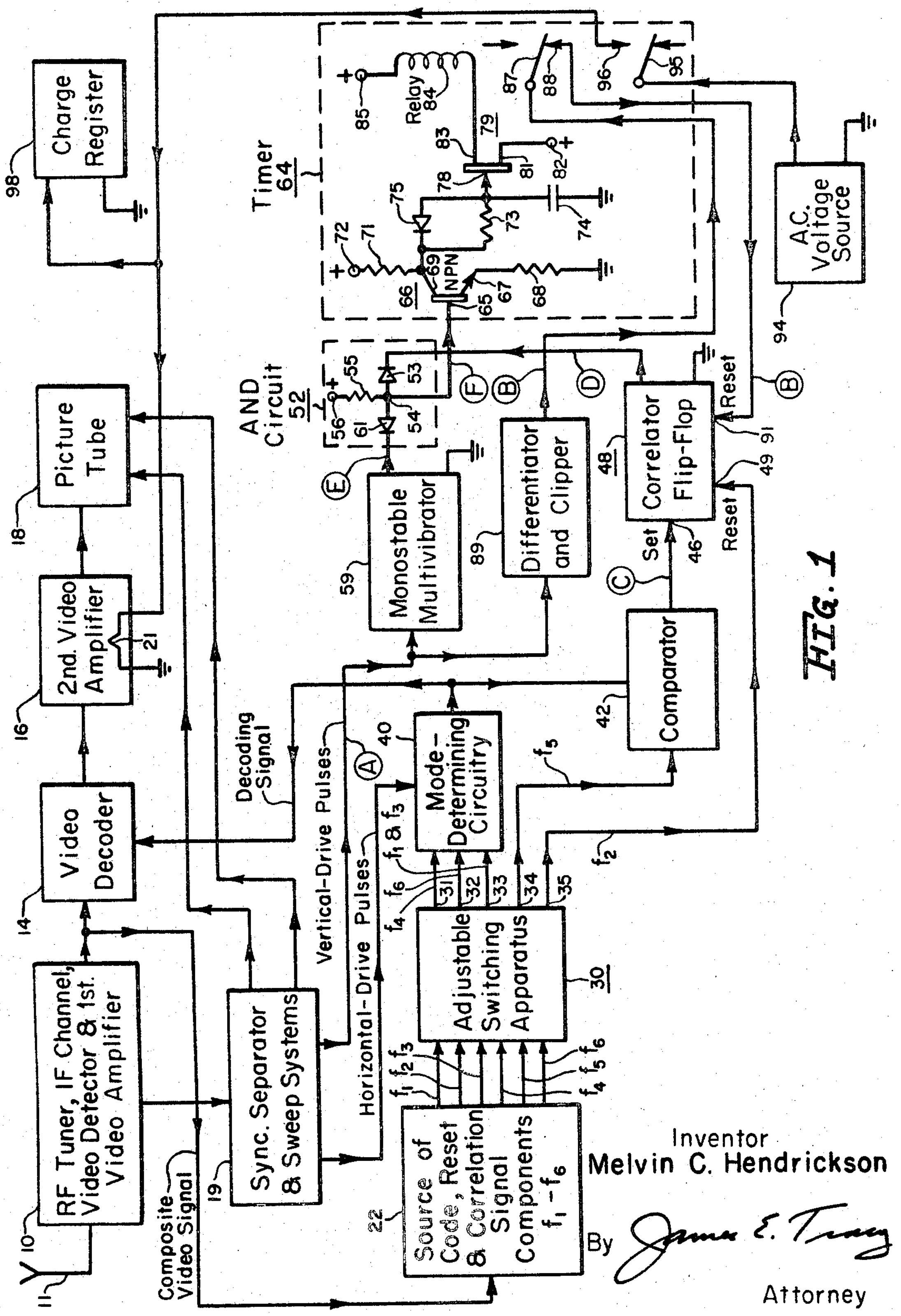

This invention relates to a subscription television receiver of the type including an adjustable apparatus which must be adjusted by the subscriber in a particular prescribed manner before a received television signal may be intelligably reproduced. More particularly, it pertains to correlation testing circuitry for determining if the adjustable apparatus of such a receiver has in fact been properly positioned.

Correlation testing arrangements for subscription television receivers have been disclosed in several patents and copending applications; see, for example, Patent 3,011,016, issued to Erwin M. Roschke on Nov. 28, 1961; 3,081,377, issued on Mar. 12, 1963 to Norman T. Watters; and 3,244,806 issued Apr. 5, 1966 to George V. Morris; and copending applications Ser. No. 518,191, filed Jan. 3, 1966 in the name of Charles F. Hepner; and Ser. No. 568,599, filed July 28, 1966 in the name of Emil S. Walker, all of which patents and applications are assigned to the present assignee. In each of these prior disclosures there is described a subscription television receiver including an adjustable switching apparatus, of one form or another, which has a multiplicity of different conditions of adjustment or switch positions. The subscriber is obliged to establish the apparatus in a given condition of adjustment for each subscription television program, which condition is preferably different for each program. Correlation testing circuitry effectively examines the actual adjustment of the switching apparatus and compares that adjustment with the given adjustment in accordance with which the apparatus should be positioned for the particular program in question. If the testing circuitry indicates correct correlation, the receiver is enabled or made operable in order to intelligibly reproduce the received television signal and a charge or use meter is actuated to provide a permanent record of programs viewed.

To make certain that the receiver is not enabled and the charge register is not falsely actuated when the switching apparatus is incorrectly positioned, most of these prior disclosures contemplate that a series of independent time-spaced correlation tests be conducted during a relatively long testing period and that intelligible reproduction of the television signal and actuation of the charge register be withheld until all of the correlation tests during that period have been made and have proved successful.

More specifically, in the receivers shown, for example, in Patent 3,244,806—Morris and in copending application Ser. No. 518,191—Hepner, a separate correlation test is performed during the latter half of each field or vertical-retrace interval. Immediately prior to each test, such as during the first half of each vertical-retrace interval, a multicondition mechanism (for example, a monostable multivibrator or a flip-flop) is established in a reset or reference operating condition. This may be done by internal cycling circuitry in the case of a monostable multivibrator or by reset pulses in the case of a flip-flop. Decoding is achieved by means of a rectangular shaped decoding signal developed in the receiver and whose amplitude variations between its two levels are influenced by the particular adjustment of the switching apparatus at the time. A correlation signal component is transmitted to the receiver some time during the second half of each vertical-retrace interval (its timing varying from interval to interval) and each of these correlation components is compared with the decoding signal to conduct a correlation test. If the receiver switching apparatus is properly positioned, each correlation component will exhibit a predetermined relation with respect to the decoding signal (specifically the correlation component occurs when the rectangular shaped decoding signal is at a certain one of its two amplitude levels) and the test will provide an indication of correct correlation in the form of a single control pulse which actuates the multicondition mechanism from its reset condition to a second or set operating condition.

Establishing the mechanism in its reset condition prior to each correlation test insures that an indication of correct correlation is not manifest unless, as a result of a correlation test, it is determined that there is in fact a correlation signal component, and that, moreover, the adjustment of the switching apparatus is correlated to the timing of that component. This is an advantageous feature since there will be no opportunity for a representation in the receiver of correct correlation in the absence of a correlation test.

In the Morris and Hepner systems it is contemplated that a testing period of approximately ten seconds duration will be employed to positively confirm the correctness of the adjustment of the switching apparatus. If adjusted properly, the multicondition mechanism is actuated from its reset to its set condition during the second half of each of the vertical-retrace intervals in the ten-second period (and there will be 600 of such retrace intervals) and will remain in that set condition until the first half of the next succeeding vertical-retrace interval at which time the mechanism is reset. A relay is coupled to the output of the multicondition mechanism in Morris and Hepner and becomes energized when the mechanism is in its set condition. The construction of the relay is such that a time constant is effectively introduced in order that the relay does not become de-energized during the relatively short time interval immediately preceding each correlation test when the mechanism is established in its reset condition. In other words, the relay is made to have a certain degree of inertia so that once energized it does not become de-energized until the multicondition mechanism remains in its reset condition for an interval substantially greater than the short interval between reset and set in a properly correlated receiver. On the other hand, if a test indicates incorrect correlation the mechanism remains in its reset condition until at least the next succeeding vertical-retrace interval and this is long enough to cause the relay to de-energize.

Energization of the relay in Morris and Hepner throughout the entire ten-second testing period causes a mechanical timing device to progress from a starting condition to a final condition which in turn effects the closing of switch contacts to complete an enabling circuit for the receiver and attain intelligible reproduction of the coded television signal. A single test failure during the ten-second testing period de-energizes the relay and this causes the timer to return to its starting condition and effectively initiate another testing period.

The relay, which controls the timer in Morris and Hepner, represents a relatively expensive circuit element and its cost is enhanced because of the requirements that must be satisfied. The relay must remain energized between reset and set during vertical retrace but yet it must de-energize well within a field or vertical-trace interval in response to a test indicating incorrect correlation. Preferably, the relay should de-energize within one-half of a vertical-trace interval.

The present invention, in accordance with one of its aspects, constitutes an improvement over the receivers shown in Morris and Hepner in that there is provided correlation testing circuitry, for controlling a timer, comprising a simplified arrangement of relatively few circuit elements and materially less expensive than the testing circuitry in Morris and Hepner. A salient feature of applicant's invention is that a constant control effect throughout a relatively long testing period may be produced from the output of a multicondition mechanism that is actuated back and forth between its set and reset operating conditions during that period and yet this may be achieved only when there is correct correlation and without a relay of any type.

It is, therefore, an object of the present invention to provide a new and improved subscription television receiver.

It is another object to provide an improved subscription television receiver employing the correlation testing principle.

A subscription television receiver, constructed according to one aspect of the invention, comprises an adjustable apparatus which must be established by the subscriber in a given adjustment to effect utilization of a received television signal. There is a multicondition mechanism having set and reset operating conditions and this mechanism develops, when actuated, an output signal having an amplitude variation each time its operating condition is changed. Reset means establish the mechanism in its reset condition prior to each of a series of time-spaced testing intervals. Testing means perform a correlation test during each of the testing intervals and actuates the mechanism to its set condition in response to each test which indicates correct correlation between the given adjustment and the actual adjustment of the apparatus at the time. The output signal of the mechanism thus has a pulse component during each interval in which the mechanism is established in its reset condition. There is a pulse signal source for developing a series of pulses each of which substantially embraces a different respective one of the pulse components of the output signal when the apparatus has been properly positioned. The receiver also includes modifying means for utilizing the pulses from the pulse signal source to modify the output signal and eliminate amplitude variations therein when the apparatus has been correctly adjusted, thereby to provide a control effect which remains at a substantially constant level for a predetermined testing period embracing several of the correlation tests.

Figure 2:
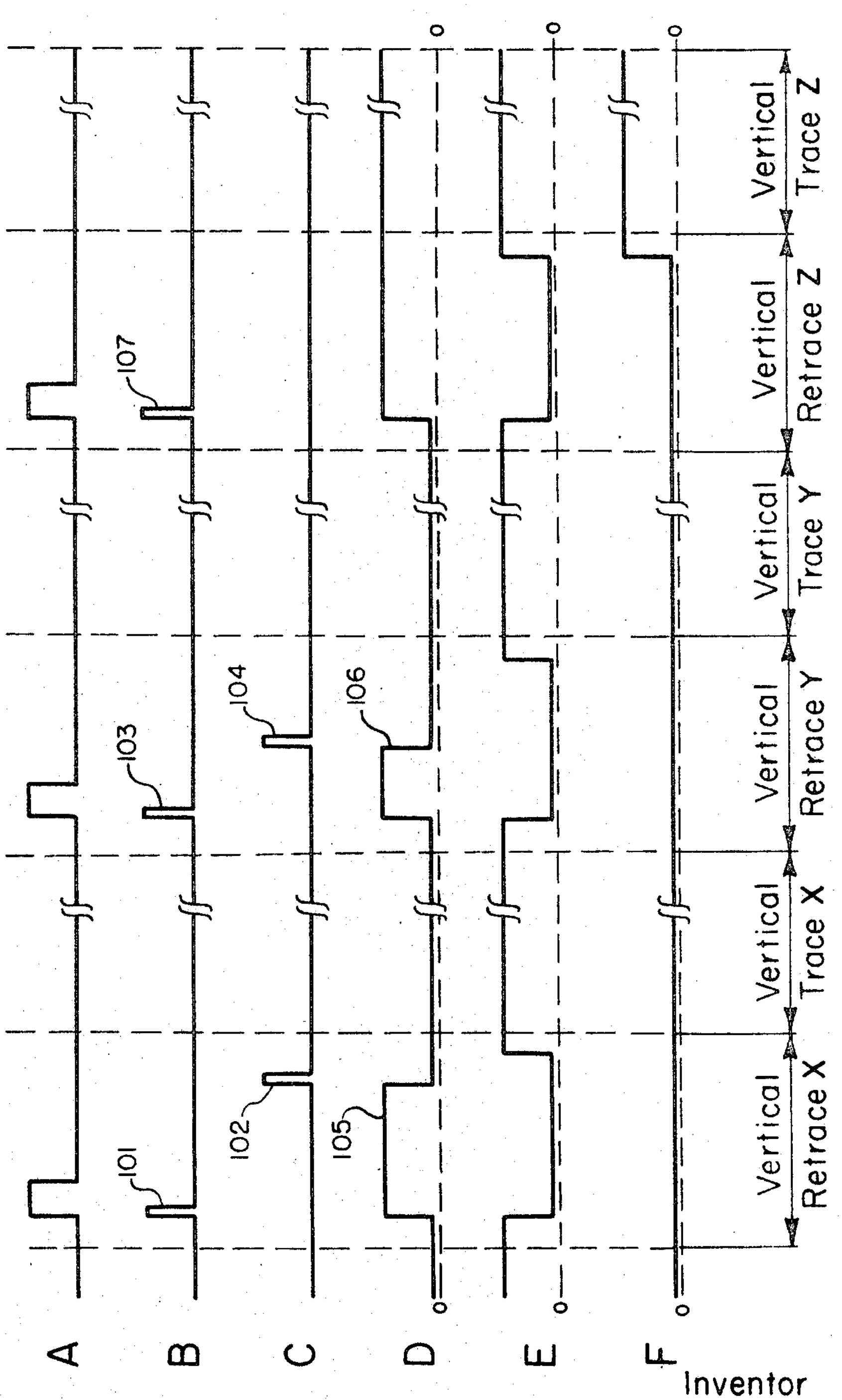

The features of this invention which are believed to be new are set forth with particularity in the appended claims. The invention, together with further objects and advantages thereof, may best be understood, however, by reference to the following description in conjunction with the accompanying drawings in which:

FIGURE 1 schematically illustrates, primarily in block diagram form, a subscription television receiver constructed in accordance with one embodiment of the invention; and FIGURE 2 comprises various idealized voltage signal waveforms which appear at various points in the circuit of FIGURE 1 and are helpful in explaining its operation. The voltage waveforms are identified by letter designations A–F and the terminals in the circuit of FIGURE 1 at which these voltages appear are indicated by corresponding encircled letters.

A subscription television transmitter for producing a coded television signal of the type to be utilized by the receiver of FIGURE 1 is shown in detail in the aforementioned Hepner application, Ser. No. 518,191, and in other patent disclosures to which reference is made in the Hepner case. Very briefly, in the transmitter the video signal is coded in a coding device by switching it at random between one operating mode, in which the video is delayed by a delay line for a time duration $\Delta t$ (equal to a very small portion of a horizontal-trace interval) with respect to the synchronizing signals and another mode wherein the video is translated normally or without delay. In this way, only randomly selected horizontal lines of video information are delayed. The mode changes are made in response to the amplitude variations of a rectangular shaped coding signal developed by mode-determining circuitry which includes a 14:1 counting circuit in the form of a 7:1 step-down blocking oscillator the output of which is coupled to a bistable multivibrator. The oscillator is periodically driven in response to horizontal-synchronizing pulses to effect cyclic actuation of the counting circuit. In addition, the multivibrator is randomly actuated, during each field or vertical-retrace interval, by a series of random code signal components of different identifying frequencies that are permutably applied, via an adjustable switching apparatus, to different input circuits of the bistable multivibrator. The timing of the amplitude variations of the coding signal, and therefore the mode changes, are determined in part by the particular instantaneous adjustment of the switching apparatus and in part by the random code signals. A different condition of adjustment preferably is employed for each subscription telecast or program.

The receiver of FIGURE 1 operates in complimentary fashion in order to decode the coded video signal produced and transmitted by the transmitter. In short, a similar mode-determining circuit and switching apparatus, which must be adjusted to the same setting as the switching apparatus at the transmitter, operate in response to the horizontal-synchronizing pulses of the television signal and to the same random code signal components to develop a decoding signal having a waveshape identical to that of the coding signal. That decoding signal is then employed in the receiver to actuate a decoding device in precise step or synchronism with the transmitter coder and in complementary fashion to delay by duration $\Delta t$ only those horizontal lines of video information not delayed at the transmitter, while permitting the delayed lines of the received viedo signal to be translated through the receiver video channel without introducing any delay. In other words, when there is a time delay $\Delta t$ between the occurrence of a radiated horizontal-sync pulse and the video information occurring during the immediately succeeding horizontal-trace interval, that line of video information is translated through the decoder with no delay, whereas when there is no delay introduced at the transmitter, a delay $\Delta t$ is imparted to the video signal in the decoder. In this way, each horizontal trace of video information is delayed for interval $\Delta t$ once, but no more than once, at either the transmitter or receiver.

The receiver is schematically shown in FIGURE 1 and will now be described in greater detail. A more thorough explanation of portions of FIGURE 1, however, may be found in the Hepner application and in references mentioned therein. A cascaded arrangement of a radio frequency or RF tuner (comprising a radio frequency amplifier and an oscillator-mixer), an intermediate frequency or IF amplifying channel of one or more stages, a video detector, and a first video amplifier is represented in FIGURE 1 by a single block 10 having input terminals connected to a receiving antenna 11 and output terminals coupled through a video decoder 14 to the input terminals of a second video amplifier 16 which, in turn, is coupled to the input of an image-reproducing device or picture tube 18. Video decoding device 14 may be identical in construction to the video coder employed in the transmitter and includes a time delay network, for introducing a delay of duration $\Delta t$ to an applied video signal, and an electronic switch having two operating conditions. In one condition, the delay network is interposed in the video channel to delay the video with respect to the sync information, and in the other condition the delay network is removed from the video channel so that the video signal is translated through the decoder without the introduction of any significant time delay.

An output of the first video amplifier in block 10 is coupled to a synchronizing signal separator which controls the usual vertical-sweep and horizontal-sweep systems that are connected, in turn, to the deflection yokes (not shown) associated with picture tube 18. For convenience, the sync separator and the vertical and horizontal-sweep systems have been shown by a single block 19.

It is assumed that second video amplifier 16 contains a vacuum tube, the filament of which is shown in the drawing and designated by the numeral 21. The circuitry for applying heater voltage to that filament will be described hereinafter. Suffice it to say at this point that filament 21 is not energized, to render amplifier 16 operable, until after the correlation testing procedure has been completed and it has been positively found that there is a correct condition of correlation between the setting of the adjustable switching apparatus at the receiver and that at the transmitter. With filament 21 energized, intelligible reproduction of the video signal is obtained, assuming, of course, that video decoder 14 is properly operated to decode the video signal.

The audio circuitry of the receiver has not been shown in FIGURE 1 since that circuitry is not necessary to illustrate the operation of the present invention.

The random code signal components, developed in the transmitter and employed to code the video signal, take the form of signal bursts occurring during vertical retrace and exhibiting at random any one of four different frequencies selected from a group of six frequencies designated $f_1$–$f_6$. One of the two frequencies not used for coding is employed for correlation testing purposes while the other is used to achieve a reset function in the receiver. The particular frequencies selected from the group $f_1$–$f_6$ for correlation testing and reset preferably are changed from program to program. For a particular program to be subsequently considered, by way of example, frequencies $f_1$, $f_3$, $f_4$ and $f_6$ are used for coding, frequency $f_5$ for correlation testing and frequency $f_2$ for reset. As fully described in the Hepner application, the signal bursts of the frequency assigned to resetting are normally not required, and are thus not transmitted, until the conclusion of a program.

In order to control the decoding equipment at the receiver, the code signal bursts as well as the reset and correlation signal bursts are added to the composite video signal in the transmitter during the vertical-retrace intervals. Separating, filtering and rectifying circuitry, shown by block 22, has an input coupled to the output of the first video amplifier in block 10 and produces from the composite video signal rectified signal bursts of frequencies $f_1$–$f_6$ on respective ones of six different output conductors of block 22 as shown by the frequency designation labels $f_1$–$f_6$ attached to those conductors in FIGURE 1.

The six output conductors of block 22 are respectively connected to six different input terminals of an adjustable switching or permuting apparatus 30 which has a series of five output terminals 31–35. Apparatus 30 has a multiplicity of different conditions of adjustment and must be established by the subscriber preferably in a different given adjustment for each subscription program before the television signal for that program may be intelligibly reproduced. It corresponds in function to the switching apparatus referred to above in the transmitter and in each different adjustment it introduces a different interconnection or permutation pattern between its six input terminals and its five output terminals. Switching apparatus 30 permutes the applied signal components as required before they are used for decoding the coded video signal and for correlation testing. However, at the end of a program when the reset signal component (namely the signal bursts of the frequency selected for reset) are transmitted, they will be translated to one of output terminals 31–35 as determined by the setting of apparatus 30. If positioned correctly, the code frequencies are channeled to terminals 31–33, the correlation frequency to terminal 34 and the reset frequency to terminal 35.

Apparatus 30 may take any of a variety of different forms. By way of example, two substantially different constructions, each of which is capable of accomplishing the function assigned to apparatus 30, are disclosed in detail in the aforementioned Morris Patent 3,244,806 and in copending application Ser. No. 514,050, filed Dec. 15, 1965 in the name of Emil C. Walker, and assigned to the present assignee.

As illustrated, apparatus 30 has been adjusted to establish a particular interconnection pattern between its input and output terminals as indicated by the frequency designation labels attached to the conductors connected to those terminals. Specifically, in accordance with the exemplified adjustment rectified bursts of frequency $f_4$ appear at output terminal 31, rectified $f_6$ signal bursts manifest at terminal 32, rectified bursts of both frequencies $f_1$ and $f_3$ are developed at terminal 33, rectified $f_5$ bursts are produced at terminal 34, and rectified bursts of frequency $f_2$ appear at output terminal 35.

Output terminals 31–33 are connected to respective ones of a series of three input circuits of a unit 40 referred to as the mode-determining circuitry and which corresponds in construction to the transmitter mode-determining circuitry. Unit 40 has another input connected to the horizontal-sweep system of block 19 to receive line-drive or horizontal-drive pulses thereover. The mode-determining circuitry includes a 14:1 counting or cycling circuit provided by a 7:1 blocking oscillator cascade connected to a bistable multivibrator. The blocking oscillator, driven by the horizontal-drive pulses, in turn drives the multivibrator the output of which is connected to the electronic switch in video decoding device 14. Mode-determining circuitry 40, in response to the horizontal-drive pulses, therefore products for application to the video decoder a rectangular-wave decoding signal which experiences amplitude excursions at the completion of every seven line-trace intervals.

The three conductors connected to terminals 31–33 connect to different inputs of the bistable multivibrator. Since the code signal components occur at random during each vertical-retrace interval, the periodic actuation of the mode-determining circuitry, under the influence of the horizontal-drive pulses, is interrupted during each vertical retrace by the code signal components. The effect of these components is to vary, during vertical retrace, the phase of the rectangular shaped decoding signal. Since decoder 14 is actuated to make a mode change in response to each amplitude change of the decoding signal, the waveform of that decoding signal reflects or represents the code schedule in accordance with which the decoding device operates.

A correlation testing arrangement is provide to effectively examine the adjustment of switching apparatus 30 to determine if it is properly adjusted for any given program. Specifically, output terminal 34 of apparatus 30 is connected to one input of a comparator 42, which may take the form of a gate, another input of which is connected to the output of the bistable multivibrator in mode-determining circuitry 40 to receive the decoding signal therefrom. In the example illustrated, it is assumed that frequency $f_5$ has been chosen to achieve the correlation testing function. These $f_5$ correlation components effectively represent the required correct adjustment in accordance with which apparatus 30 should be adjusted. If apparatus 30 is correctly adjusted (namely its setting agrees with that of the corresponding switching apparatus at the transmitter), the rectified $f_5$ signal bursts will be applied to comparison circuit 42.

To elucidate, the transmitter is operated so that the timing of the $f_5$ signal bursts is related to the code schedule of the coded video signal, namely the schedule as represented by the amplitude excursions of the coding signal developed in the output of the bistable multivibrator in the transmitter mode-determining circuitry. This is accomplished by transmitting an $f_5$ burst at some time during the second half of each vertical-retrace interval when the transmitter bistable multivibrator is established in a prescribed one of its two conditions. Logic circuitry is employed to make certain that the multivibrator is in that prescribed condition during at least part of the latter half of each vertical retrace so that there will be an $f_5$ signal burst (but only one such burst) during each vertical-retrace interval. Hence, if the receiver is appropriately adjusted, the bistable multivibrator in mode-determining circuitry 40 should be in the same prescribed condition upon the arrival of each of the $f_5$ bursts.

These $f_5$ correlation signals determine the instants at which the correlation tests are to made in the receiver (one test per vertical retrace) and represent, by their timing, the setting of the adjustable switching apparatus at the transmitter. This follows since a different adjustment of the transmitter switching apparatus results in a different timing of the correlation components. The correlation bursts are effectively employed at the receiver to check the adjustment of the receiver switching apparatus. Since the waveshape of the decoding signal produced by mode-determining circuitry 40 is influenced by switching apparatus 30, that waveshape may be said to represent the instantaneous setting of the receiver switching apparatus. Comparator or gate 42 compares the waveshape of the decoding signal with the series of $f_5$ correlation signal components. If switching apparatus 30 is properly set up, there will be developed at the output of the comparator, and during the latter half of each vertical retrace, an indication of correct correlation in the form of a single control pulse. Each rectified $f_5$ burst is effectively gated in by gate 42 so that it appears at the output of the gate. When there is incorrect correlation between the given required adjustment for apparatus 30 and its actual adjustment at the time, the waveform of the decoding signal will not exhibit the necessary magnitude at the instants of at least some of the correlation tests and thus the $f_5$ rectified pulses will not be gated in and produced in the output of comparator 42 for those tests. As will be shown, there must be an uninterrupted series of pulses (one every vertical retrace) at the output of comparator 42 throughout a ten-second testing period before a correct setting of apparatus 30 is confirmed. Every single correlation test (and there will be 600 vertical-retrace intervals during that ten-second period giving rise to 600 such tests) must prove successful before the correlation testing circuitry makes a conclusive determination of correct correlation.

To this end, the output terminals of comparator 42 connect to an input 46 of a multicondition mechanism in the form of a bistable multivibrator or flip-flop 48 having two stable operating conditions, designated for convenience as the "set" and "reset" conditions respectively. It will be seen that unit 48 effectively indicates the correlation status of apparatus 30. Hence, it is appropriately entitled the "correlator flip-flop." Input 46 is so connected that each time a control pulse is applied over that input the flip-flop is triggered to its set operating condition. For that reason, the label "set" is associated with input 46 in FIGURE 1.

Output terminal 35 of apparatus 30 is connected to an input 49 of multistable mechanism 48. As mentioned previously, one of the six available frequencies $f_1$–$f_6$ is reserved for resetting purposes and bursts of that frequency ($f_2$ for the assumed case) are ordinarily not transmitted until the conclusion of a subscription television program. When apparatus 30 is correctly positioned, these reset signal components are developed at output terminal 35 for application to input 49, which is so connected that each pulse applied thereover actuates flip-flop 48 to its reset stable operating condition, in the event that it is not already established in that condition.

The output signal of flip-flop 48 is rectangular shaped experiencing an amplitude excursion each time the operating condition of the flip-flop changes. As will be explained, flip-flop 48 is reset immediately prior to each correlation test in the ten-second testing period; specifically, it is reset in response to the leading edge of each vertical-drive pulse which of course occurs during the first half of each vertical retrace. If a test indicates correct correlation the flip-flop is triggered to its set condition by a control pulse from the output of comparator 42. Consequently, even though the receiver may be properly correlated, flip-flop 48 will still be established in its reset condition for a relatively short time interval immediately preceding each correlation test, with the result that the flip-flop output signal will have a pulse component during each of those time intervals. For reasons to become apparent, it is desirable that the rectangular wave output signal of multicondition mechanism 48 be effectively modified to eliminate amplitude variations therein when apparatus 30 has been correctly adjusted in order that the modified output signal remains at a substantially constant amplitude level throughout the entire ten-second testing period.

To achieve such a modification, in accordance with a salient feature of the invention, the lower output terminal of multicondition mechanism or flip-flop 48 is connected to a plane of reference potential, such as ground, while its upper output terminal is connected to one input of a positive logic diode AND circuit 52; specifically, the input is connected to the cathode of a diode 53, the anode of which is connected to a circuit junction or terminal 54 connected via a resistor 55 to the positive terminal 56 of a source of unidirectional operating potential, the negative terminal of which is grounded.

A monostable multivibrator 59 is connected to the sync separator portion of unit 19 to derive vertical-drive pulses therefrom, which pulses are produced from the vertical-synchronizing components of a received television signal. Multivibrator 59 is constructed such that the leading edge of each vertical-drive pulse actuates multivibrator 59 from its normal or home condition to its abnormal condition in which it remains under the control of its internal cycling circuitry until a time just prior to the conclusion of the associated vertical-retrace interval, at which time the multivibrator automatically returns to its normal operating condition. In this way, multivibrator 59 is established in its abnormal operating condition during that portion of each vertical-retrace interval containing the signal bursts of frequencies $f_1$–$f_6$. The lower output terminal of multivibrator 59 is grounded while its upper output terminal is connected to another input of AND circuit 52, specifically to the cathode of a diode 61 the anode of which is connected to circuit junction 54. For reasons to be explained, both flip-flop 48 and multivibrator 59 are preferably relatively low impedance voltage sources.

The output of AND circuit 52 controls a timer 64 which is effectively permitted to progress from a starting or reference condition to a final condition during the ten-second testing period but only if every correlation test in that period reflects a correct correlation status. More particularly, junction 54 is connected to the base 65 of a transistor 66 of bipolar type and of NPN gender, the emitter 67 of which is connected to ground through a resistor 68. The collector 69 of the transistor is connected by way of a resistor 71 to the positive terminal 72 of a source of unidirectional operating potential, the negative terminal of which is grounded. The junction of collector 69 and resistor 71 is connected via a resistor 73 to the upper terminal of a charging capacitor 74, the lower terminal being grounded. Resistor 73 is shunted by a diode 75 which is poled such that its cathode is connected to collector 69 while its anode is connected to the upper terminal of capacitor 74.

The ungrounded terminal of capacitor 74 also connects to the gate 78 of a unipolar transistor in the form of a field effect transistor 79, the source 81 of which is directly connected to the positive terminal 82 of a source of unidirectional operating potential, the negative terminal being grounded. Transistor 79 may specifically consitute a junction field effect transistor of the depletion type which turns on or becomes conductive when its gate and source are at approximately the same potential. The drain 83 of transistor 79 is connected through a relay 84 to the positive terminal 85 of a source of unidirectional operating potential, the negative terminal being grounded. Potential source 85 preferably is substantially greater in magnitude than source 82 which may be the same as source 72.

Relay 84 does not energize until after a ten-second testing period has confirmed correct correlation and in response to such energization (1) the correlation testing circuitry is rendered ineffective, (2) an enabling circuit is effectively energized to permit the receiver to achieve intelligible reproduction of the decoded television signal, and (3) a charge register is actuated to record the fact that the subscriber has subscribed to the program in question. Specifically, movable relay contact 87 normally engages fixed contact 88 to complete a connection from the output of a differentiator and clipper circuit 89 to a reset input 91 of multicondition mechanism 48. Unit 89, whose input is coupled to the output of unit 19 at which vertical-drive pulses are provided, produces an output pulse for application to reset input 91 in response to and in time coincidence with the leading edge of each vertical-drive pulse.

An A.C. voltage source 94 is provided for producing an A.C. voltage of a magnitude suitable for, inter alia, energizing filament 21. One output terminal of source 94 is grounded while the other is connected to the movable relay contact 95 which is normally disconnected from its companion fixed relay contact 96. One terminal of filament 21 is connected to contact 96 while its other terminal is grounded. Contact 96 also connects to one input of a charge register 98 whose other input terminal is grounded. The charge register actuates in response to the application of voltage from source 94 to record a separate charge on a recording medium for each program viewed by the subscriber.

Consideration will not be given to an explanation of the overall operation of the described subscription television receiver for a given program. It will be assumed that the adjustment of apparatus 30 required for that program is the same as that illustrated in FIGURE 1. The received television signal, which has been coded at the transmitter by delaying certain ones only of the horizontal lines of video information, is intercepted by antenna 11, amplified in the radio frequency amplifier and heterodyned to the selected intermediate frequency of the receiver in the oscillator-mixer. The intermediate frequency signal is amplified in the intermediate frequency channel and detected in the video detector to produce a coded composite video signal which is then amplified in the first video amplifier. The amplified video is translated through the cascade arrangement of video decoder 14 and second video amplifier 16 to the input electrodes of picture tube 18 to control the intensity of the cathode ray beam thereof in conventional manner. Of course, this occurs only after filament 21 of second video amplifier 16 has been energized in a manner to be described. The vertical and horizontal sweep systems in unit 19 are controlled in conventional manner by the synchronizing signal separator.

Unit 22 separates from the composite video signal the random code signal components of frequencies $f_1$, $f_3$, $f_4$ and $f_6$ and the correlation signal components of frequency $f_5$ and rectifies these code and correlation components for application to five of the six inputs of switching apparatus 30. Since the apparatus is properly conditioned, those components will be correctly routed to output terminals 31–34. The code components will therefore be channeled to the appropriate inputs of the bistable multivibrator in mode-determining circuitry 40. That multivibrator, which is periodically actuated by the output of the horizontal-drive pulse driven 7:1 blocking oscillator in unit 40, is triggered by the random code signal components during each vertical retrace in exact synchronism with the actuation of the corresponding multivibrator in the transmitter.

The rectangular shaped decoding signal, produced in the output of the receiver mode-determining circuitry, thus has a waveform which is identical to that of the coding signal used for coding the video signal in the transmitter. The electronic switch in decoder 14 will therefore be actuated by the decoding signal in precise time coincidence with the counterpart electronic switch in the transmitter coder, which is necessary to decode the received coded television signal.

The operation of the correlation testing arrangement, which embodies the present invention, may best be understood by reference to the voltage signal waveforms of FIGURE 2 that illustrates the operation over a time period covering three vertical-retrace intervals and three vertical-trace intervals. The three vertical-retrace intervals are designated in FIGURE 2 as "vertical retrace X," "vertical retrace Y," and "vertical retrace Z," while each of the vertical-trace intervals is labeled by the same letter indicia as the retrace interval that it follows. Retrace intervals X and Y illustrate the operation of the system in the presence of correct correlation, while interval Z indicates the operation when apparatus 30 is incorrectly adjusted.

When the television receiver is first turned on, presumably at the beginning of the program, capacitor 74 will not be charged and timer 64 may be considered to be in its starting or reference condition. At this time, relay 84 is deenergized. The vertical-drive pulses are shown by waveform A and in response to the leading edge of each of those pulses differentiator and clipper 89 produces a positive-going pulse, shown in waveform B, which is applied to input 91 of flip-flop 48 via relay contacts 87 and 88 which are now in engagement. Multicondition mechanism 48 is therefore actuated to its reset condition by the leading edge of each vertical-drive pulse.

Since each $f_5$ correlation signal burst occurs during the latter half of a vertical-retrace interval, which is subsequent to the vertical-drive pulse during that interval, flip-flop 48 will be established in its reset condition immediately prior to each correlation test. Each rectified burst of frequency $f_5$ is channeled through apparatus 30 to comparator or gate 42. Inasmuch as it is assumed that the receiver is properly positioned during retrace intervals X and Y, the timing of the $f_5$ correlation pulses for those intervals will be correlated with the decoding signal produced in the output of mode-determining circuitry 40 such that the decoding signal has a magnitude at the instants of the correlation pulses appropriate to effectively turn gate 42 on and translate those correlation pulses, as positive-going pulses, to flip-flop 48. The output pulses of comparator 42 are shown by voltage waveform C. Inasmuch as correct correlation exists only during vertical retraces X and Y, curve C contains positive-going pulses during those intervals only. Since the $f_5$ correlation components may occur at different times within the second halves of the vertical-retrace intervals, the pulses of waveform C are differently spaced with respect to their immediately preceding reset pulses of curve B. Approximately thirteen horizontal-trace intervals separate pulses 101 and 102 within vertical retrace X, while only about six horizontal traces occur between the reset pulse 103 of curve B and the following pulse 104 of waveform C during vertical retrace Y.

Each pulse of curve C developed in the output of comparator 42 actuates correlator flip-flop 48 from its reset condition (to which it had been previously actuated by a reset pulse of curve B from the output of differentiator and clipper 89) to its set condition in which it remains until it is reset just prior to the next correlation test. The output pulses of gate 42 may thus be called "set pulses." The output signal of flip-flop 48 is shown by waveform D; it is rectangular shaped having an amplitude variation each time the operating condition of the flip-flop is changed. As illustrated, the output signal of curve D includes positive-going pulse components 105 and 106 during the relatively short intervals within vertical-retraces X and Y when flip-flop 48 is in its reset condition. When flip-flop 48 is in its set condition the signal of waveform D is at its lowermost amplitude whereas when the flip-flop is in its reset condition the D signal assumes its uppermost level. Until the occurrence of reset pulse 107 of curve B (during vertical retrace Z), flip-flop 48 is established in its set condition most of the time. Since vertical retrace Z illustrates the operation of the system when apparatus 30 is incorrectly adjusted, the correlation test performed during that interval results in the absence of a pulse at the output of comparator 42 and thus there will be no set pulse in curve C to actuate flip-flop 48 to its set condition after it is reset by pulse 107. The output signal of curve D thus remains at its most positive amplitude level subsequent to retrace Z and throughout at least the succeeding vertical-trace interval Z.

In accordance with a feature of the invention, the output signal of curve D is inhibited during the intervals from each reset time (defined by a B pulse) to the immediately succeeding correlation test. By so doing, pulse components 105 and 106 of cuve D may be effectively removed so that a constant amplitude signal is applied to the input of timer 64 during the time period covered by retraces X and Y and traces X and Y. The positive-going pulses 105 and 106 of curve D are inhibited in AND circuit 52 by the negative-going inhibiting pulses of curve E produced by multivibrator 59 during vertical retrace.

To explain, each negative-going E pulse starts in response to the leading edge of a vertical-drive pulse of curve A and the internal cycling circuitry of multivibrator 59 is such that the E pulse does not automatically terminate until shortly before the conclusion of the associated vertical-retrace intervals. As a consequence, no matter when a correlation test is made within a vertical retrace, the negative-going inhibiting pulse during that interval will be of sufficient width to embrace the positive-going pulse component of curve D occurring during that interval when apparatus 30 is correctly positioned. This is evident by comparing waveforms D and E during retrace intervals X and Y. AND circuit 52 responds to the inhibiting signal of waveform E and the flip-flop output signal of curve D and whenever either of those signals is established at its lowermost (namely least positive) amplitude level, the output signal of circuit 52 (shown by waveform F) will be at its lowermost amplitude level. On the other hand, when both of the signals of curves E and D are established at their most positive amplitude levels, the signal of curve F assumes its maximum amplitude level. In short, two positive inputs are required to produce a positive output in AND circuit 52. Circuit 52 may also be considered a negative logic OR circuit since only one negative input is needed to provide a negative output.

More particularly, it will be recalled that each of units 59 and 48 constitutes a relatively low impedance voltage source, as a consequence of which the impedance between the cathode of diode 61 and ground is relatively low when the diode is conducting, and likewise the impedance between the cathode of diode 53 and ground is low when diode 53 is turned on. The voltage levels of curves D and E and the construction of AND circuit 52 are such that diode 53 cuts off when curve D is at its uppermost or most positive level but is rendered conductive when the D signal is established at its minimum or least positive amplitude level. Likewise, diode 61 is cut off when the inhibiting signal of curve E is at its most positive amplitude level but the diode turns on during the occurrence of the negative-going inhibiting pulses of that signal. Because of the low impedance of units 59 and 48, the upper output terminal of flip-flop 48 is established at close to ground or zero potential when diode 53 conduits and the upper output terminal of multivibrator 59 is established at close to ground potential when diode 61 conduits. This is evident by the zero voltage reference levels shown for curves D and E.

If either one of diodes 53, 61 is conductive, circuit junction 54 is thus established at close to ground potential as shown by curve F. Since at least one of diodes 53, 61 is conducting until the occurrence of the trailing edge of the E pulse in retrace Z, waveform F remains at its lowermost amplitude level throughout retrace intervals X and Y and trace intervals X and Y. When both curves D and E are at their maximum positive levels, however, both diodes 53 and 61 are turned off and the potential at junction 54 increases in a positive sense. The signal of waveform F is consequently established at a substantially positive level during vertical trace Z.

By employing the negative-going inhibiting pulses of curve E to inhibit or remove only those positive-going pulse components of curve D which are embraced by the E pulses, the signal of curve D is effectively modified by eliminating all of the amplitude variations in the D signal but only when apparatus 30 has been correctly adjusted. The F signal is essentially a modification of the D signal and provides a constant amplitude control effect if apparatus 30 is set properly.

Transistor 66 of timer 64 remains cut off so long as the signal of curve F, which is applied to base 65, is established at its minimum amplitude level. During that time, capacitor 74 charges through resistors 73 and 71 toward the positive potential of source 72. In the meantime, field effect transistor 79 remains nonconductive since its gate 78 is negative with respect to source 81. While transistor 66 is cut off, capacitor 74 continues to charge and the voltage at the upper terminal of that capacitor increases in magnitude in a positive direction. The charging time constant of the timer is arranged so that starting at the instant capacitor 74 begins to charge, which may be considered the starting condition of timer 64, transistor 66 must remain nonconductive for approximately ten seconds before the capacitor charges sufficiently to establish gate 78 at a potential equal to the positive potential at source 81, at which time transistor 79 turns on and causes energization of relay 84. Of course, in order to permit the timer to progress from its starting condition to its final condition (at which capacitor 74 is sufficiently charged to turn transistor 79 on), the signal applied to base 65 must remain at its minimum amplitude level or close to ground potential throughout the entire ten-second testing period, and this means that every single one of the 600 correlation tests during that period must indicate correct correlation. If there is a single failure, as is the case during retrace interval Z, the signal applied to base 65 becomes substantially positive to the extent necessary to turn transistor 66 on and provide a fast discharge path for capacitor 74. The capacitor will instantly discharge or "dump" through the circuit including diode 75, the collector-emitter path of transistor 66 and resistor 68. Thus, a single test failure causes the return of timer 64 to its starting condition and another ten-second testing period is initiated.

When a ten-second testing period has been successfully concluded, the energization of relay 84 causes relay contacts 95 and 96 to engage and apply A.C. voltage from source 94 to the input of charge register 98 to effect actuation thereof, thereby to achieve charge recording. Voltage from source 94 is also applied via contacts 95 and 96 to filament 21 of second video amplifier 16 to achieve energization thereof and render the amplifier operable so that the decoded video signal developed at the output of decoder 14 may be extended to picture tube 18.

As explained, timer 64 immediately returns to its starting condition if there is only a single correlation test failure during the ten-second testing period to make absolutely certain that apparatus 30 is correctly adjusted to the prescribed setting required for the program under consideration before a charge is recorded and the video signal is supplied to the picture tube. Of course, momentary interruptions of the code and correlation signal components as a result of transmitter error, impulse noise, airplane flutter, signal fading, etc., occurring during the ten-second testing period also result in the conduction of transistor 66 with the consequent return of timer 64 to its starting condition even though switching apparatus 30 may be correctly positioned. Under such circumstances, the completion of the correlation testing procedure will be delayed slightly. For example, if airplane flutter results in conduction of transistor 66 after only eight seconds of the testing period, timer 64 returns to its starting condition so that another ten seconds is required before it may reach its final condition. Thus, eighteen seconds would be required to effectively perform a sufficient number of correlation tests to make a conclusive determination that the switching apparatus is correctly set.

While such a loss of correlation is not objectionable during the correlation testing period, it is desirable that any such loss should be avoided after the testing period has been completed and the video channel has been rendered operable. Otherwise, video may be momentarily lost with each correlation loss which, of course, is most undesirable. It is preferred that once an initial ten-second testing period has positively confirmed that correct correlation exists, relay 84 remains energized to prevent a loss of video even though the code and correlation signal components are interrupted for a relatively long time interval.

This is achieved by the opening of contacts 87 and 88, in response to energization of relay 84, which prevents the application of reset pulses from differentiator and clipper 89 to input 91 of flip-flop 48. As a consequence, only set pulses from comparator 42 will be applied to flip-flop 48. It will therefore remain in its set condition causing its output signal to remain at its minimum amplitude level and retain transistor 66 in its OFF condition with the result that relay 84 remains energized throughout the entire program interval. If there is an interruption of the code or correlation signal components, be it momentary or for a sustained period, set pulses will not be produced by comparator 42 for application to the flip-flop. This will be of no concern, however, since flip-flop 48 will nevertheless remain in its set stable operating condition. In other words, once the correlation testing circuitry has found that correct correlation prevails and timer 64 has run up to its final condition, flip-flop 48 will remain in its set condition and relay 84 will remain energized in the absence of set pulses for an indefinite time.

At the conclusion of the program, it is desired that flip-flop 48 be actuated to its reset condition so that relay 84 will de-energize thereby to cause timer 64 to return to its starting condition. This is achieved by means of signal bursts of the reset frequency, $f_2$ for the example considered. Accordingly, at the end of the program the transmitter will be operated so that the code and correlation signal components of frequencies $f_1$ and $f_3$–$f_6$ are not included in the radiated television signal and instead are replaced by a series of signal bursts of frequency $f_2$. At the receiver, the rectified $f_2$ reset bursts will be channeled through apparatus 30 to output terminal 35 and thence to input 49 of flip-flop 48 to reset the flip-flop to its reset condition. Of course, actually only a single $f_2$ burst is needed to effect reset but a series of such bursts are employed to make absolutely certain that at least one of them achieves reset.

In the event that the subscriber tunes his subscription television receiver to another channel, to receive a non-subscription telecast, before the conclusion of the subscription program under consideration, flip-flop 48 may remain in its set condition and timer 64 in its final condition. If the receiver is then tuned to a channel carrying another subscription telecast or back to the same channel, which carried the subscription program considered, to receive a subsequent subscription program, flip-flop 48 will be reset to its reset condition unless apparatus 30 is properly adjusted for the second program. This occurs because the second program will require a different adjustment of apparatus 30, and preferably a different frequency will be selected for reset. Thus, the $f_2$ signal bursts will be code or correlation components and will effect the application of pulses over input 49 of flip-flop 48 to actuate the flip-flop to its reset condition, thereby de-energizing relay 84 and restoring timer 64 to its starting condition.

To summarize the invention in accordance with one of its aspects, a subscription television receiver is provided to which is transmitted a coded television signal for a specified subscription television program. The receiver comprises an adjustable apparatus 30 which must be established by the subscriber in accordance with a given adjustment before the coded television signal may be decoded and intelligibly reproduced. Flip-flop 48 constitutes a multicondition mechanism having set and reset operating conditions and which develops, when actuated, an output signal (waveform D) having an amplitude variation each time its operating condition is changed. Differentiator and clipper 89, contacts 87 and 88 and the associated circuitry constitute reset means for establishing mechanism 48 in its reset condition prior to each of a series of time-spaced testing intervals, namely prior to the latter half of each vertical-retrace interval. Comparator 42 provides correlation testing means for performing a correlation test during each of the testing intervals and for actuating mechanism 48 to its set condition in response to each test which indicates correct correlation between the given adjustment and the actual adjustment of apparatus 30 at the time. As a result, the output signal of flip-flop 48 contains a positive-going pulse component during each interval in which the flip-flop is established in its reset condition. Monostable multivibrator 59 constitutes a pulse signal source that develops a series of negative-going pulses (waveform E) each of which substantially embraces a different respective one of the positive-pulse components of the output signal (curve D) when apparatus 30 has been properly positioned, the case illustrated during the time duration covered by vertical retraces X and Y and vertical traces X and Y. AND circuit 52 may be considered modifying means for utilizing the negative-going pulses of curve E to modify the output signal of curve D (specifically to inhibit the D signal during the intervals from each reset time to the immediately succeeding correlation test) and eliminate amplitude variations therein when apparatus 30 has been correctly adjusted. The modified output signal (waveform F) produced by AND circuit 52 constitutes a control effect which remains at a substantially constant amplitude level for a predetermined testing period embracing several of the correlation tests, namely for a testing period of ten seconds duration which embraces 600 of the correlation tests.

While a particular embodiment of the invention has been shown and described, modifications may be made, and it is intended in the appended claims to cover all such modifications as may fall within the true spirit and scope of the invention.

I claim:

1. A subscription television receiver to which a television signal is transmitted, comprising:
- an adjustable apparatus which must be established in a given adjustment to effect utilization of said television signal;
- a multicondition mechanism having set and reset operating conditions and developing, when actuated, an output signal having an amplitude variation each time its operating condition is changed;
- reset means for establishing said mechanism in its reset condition prior to each of a series of time-spaced testing intervals;
- testing means for performing a correlation test during each of said testing intervals and for actuating said mechanism to its set condition in response to each test which indicates correct correlation between said given adjustment and the actual adjustment of said apparatus, the output signal of said mechanism having a pulse component during each interval in which said mechanism is established in its reset condition;
- a pulse signal source for developing a series of pulses each of which substantially embraces a different respective one of the pulse components of said output signal when said apparatus has been properly positioned; and
- modifying means for utilizing said pulses to modify said output signal and eliminate amplitude variations therein when said apparatus has been correctly adjusted, thereby to provide a control effect which remains at a substantially constant level for a predetermined testing period embracing several of said correlation tests.

2. A subscription television receiver according to claim 1 in which the set and reset conditions of said mechanism are stable operating conditions, and in which the modified output signal constitutes said control effect.

3. A subscription television receiver according to claim 1 and including timing means responsive to said control effect for progressing from a starting condition to a final condition during said testing period.

4. A subscription television receiver according to claim 1 in which said television signal includes vertical-synchronizing components occurring during respective vertical-retrace intervals, each of said correlation tests also occurring during a respective one of said vertical-retrace intervals but subsequent to the vertical-synchronizing component for that interval, and wherein said reset means utilizes said vertical-synchronizing components to reset said mechanism.

5. A subscription television receiver according to claim 1 in which said output signal is rectangular shaped having a first amplitude level during those intervals in which said mechanism is established in its set condition and having a second amplitude level during the intervals in which said mechanism is established in its reset condition, and wherein the modified output signal, which constitutes said control effect, is established at said first amplitude level throughout the entire duration of said testing period when said apparatus is appropriately adjusted.

6. A subscription television receiver according to claim 1 in which said output signal is rectangular shaped, wherein the pulses developed by said pulse signal source constitute inhibiting pulses, and in which said modifying means utilizes each of said inhibiting pulses to inhibit, and thus effectively remove, the pulse component embraced thereby.

7. A subscription television receiver according to claim 6 in which each of said pulse components of said output signal varies in width between predetermined minimum and maximum limits when said apparatus is correctly positioned, and wherein said inhibiting pulses are similarly shaped, periodically recurring and each of greater width than the maximum width of said pulse components.

8. A subscription television receiver according to claim 6 in which said pulse components of said output signal extend in the direction of one polarity while said inhibiting pulses extend in the direction of the opposite polarity, and in which said modifying means includes logic circuitry for developing said control effect.

9. A subscription television receiver according to claim 8 in which said output signal extends in the direction of said opposite polarity during those intervals in which said mechanism is established in its set condition, wherein said inhibiting pulses constitute an inhibiting signal the portions between said inhibiting pulses extending in the direction of said one polarity, and wherein said modifying means includes an AND circuit for developing said control effect which extends in the direction of said one polarity only when both said output signal and said inhibiting signal extend in the direction of said one polarity, said control effect extending in the opposite polarity direction so long as either said output signal or said inhibiting signal extends in the direction of said opposite polarity.

10. A subscription television receiver to which a television signal is transmitted, comprising:
- an adjustable apparatus which must be established by the subscriber in a given adjustment before said television signal may be intelligibly reproduced;
- a multicondition mechanism having set and reset operating conditions;
- means for actuating said mechanism to its reset condition at each of a series of spaced reset times;
- testing means for performing a correlation test during each of a corresponding series of spaced testing intervals intervening said series of reset times and for actuating said mechanism to its set condition in response to each test which indicates correct correlation between said given adjustment and the actual adjustment of said apparatus, thereby to develop in said mechanism a rectangular shaped output signal having an amplitude variation each time said mechanism changes operating conditions; and
- inhibiting means for inhibiting said output signal during the intervals from each reset time to the immediately succeeding correlation test thereby to provide, when said apparatus has been correctly adjusted, a modified output signal which remains at a substantially constant amplitude level for a predetermined testing period embracing several of said correlation tests.

References Cited

UNITED STATES PATENTS

| | | | |
|---|---|---|---|
| 3,140,346 | 7/1964 | Hendrickson et al. | 178—5.1 |
| 3,244,806 | 4/1966 | Morris | 178—5.1 |

RODNEY D. BENNETT, Jr., Primary Examiner

M. F. HUBLER, Assistant Examiner